United States Patent [19]

Reedom

[11] Patent Number: 5,114,185
[45] Date of Patent: May 19, 1992

[54] PROTECTIVE CUSHION FOR AUTOMOTIVE VEHICLES

[76] Inventor: Eddie R. Reedom, 823 W. 89th St., Los Angeles, Calif. 90044

[21] Appl. No.: 649,016

[22] Filed: Feb. 1, 1991

Related U.S. Application Data

[63] Continuation-in-part of Ser. No. 859,400, May 5, 1986, Pat. No. 5,005,866.

[51] Int. Cl.$^5$ .............................................. B60R 22/00
[52] U.S. Cl. ..................................... 280/801; 297/482
[58] Field of Search ....................... 280/801, 808, 751; 297/482; 446/321, 488

[56] References Cited

U.S. PATENT DOCUMENTS

| | | | |
|---|---|---|---|
| 3,936,075 | 2/1976 | Jelliffe | 280/751 |
| 3,941,404 | 3/1976 | Otaegyi-Ugarte | 280/751 |
| 4,057,181 | 11/1977 | Finnigan | 297/482 |
| 4,089,545 | 5/1978 | Ferry | 280/751 |
| 4,336,665 | 6/1982 | Moreau | 446/321 |
| 4,614,505 | 9/1986 | Schneider et al. | 446/321 |

Primary Examiner—Kenneth R. Rice
Attorney, Agent, or Firm—Robert J. Schaap

[57] ABSTRACT

Novel seat belt cushions in the form of people, places, things, birds, animals and in particular animals such as bunnies, bears, and pandas. These cushions may be constructed with a plurality of sections, limbs and objects and may be adapted with electronic devices or the like. The cushions are constructed of one or more sheets of foam padding encased by a cotton or synthetic fiber outer layer. In a preferred embodiment, lighting effects, small battery powered lights, preferably which provide representations or replicas of monuments, map layouts and other recreations may be employed in the cushions. Further, audio output, electronic circuits or miniature tape players for projecting audible messages such as safety tips may be employed. The sections and the objects are secured to the cushion by means of fasteners, preferably mating fiber fasteners such as the "Velcro" fasteners. The novel cushions are secured to a seat belt by folding around the seat belt, much in the nature of a book. An embodiment is disclosed which is provided for removable attachment to a portion of a passenger compartment of a vehicle, such as a dashboard, in order to reduce the impact to an occupant of the vehicle in the event of a collision. This latter embodiment may contain padding on the interior or a fluid pocket in order to absorb some of the force of the impact.

19 Claims, 8 Drawing Sheets

PROTECTIVE CUSHION FOR AUTOMOTIVE VEHICLES

RELATED APPLICATION

This application is a continuation-in-part of my copending application Ser. No. 859,400, filed May 5, 1986, entitled "Seat Belt Cushion In The Form of People, Places and Things", now U.S. Pat. No. 5,005,866.

BACKGROUND OF THE INVENTION

1. Field of the Invention

The present invention relates in general to novel cushions of people, places, things and animals, such as reptiles, amphibians, land mammals, sea mammals, as well as birds and fish, caricatures, insects, and more specifically, to cushions of the type stated where a plurality of cushion sections, limbs and objects and electronic devices may be adapted for cooperative assembly with the cushions in order to form the representations of people, places, things and animals.

2. Brief Description of the Prior Art

For some period of time, there has been a need for seat belt cushions which are capable of protecting occupants of vehicles and also unborn children carried by female occupants. These cushions are designed to protect, for example, the fragile female breast, the upper stomach, lower stomach, and for that matter the neck area. A cushion of this type is required which would totally encircle the seat belt with a plush form of padding and would absorb any impact in two or more stages. This cushion could be made in the form of lovable characters, stuffed animals and toys so that children and adults would be more prone to use the cushions for protection from and along with the seat belts.

The provision of protective seat belt cushions of this type has been almost totally neglected and the absence of these cushions, particularly in the novel form of loveable characters, stuffed animals and toys has presented a long felt need.

Recently, and surprising, a seat belt pad or attachment has been commercially marketed. This device, however, is very limited in makeup, structure, application and its protective qualities and other essentials are limited. This seat belt pad or attachment which has been recently commercially marketed does not present the novel features present in the protective seat belt cushions of the present invention.

There has also been a need for a protective cushion which can be removably attached to portions of a passenger compartment of a vehicle as for example, a dashboard of a vehicle. It has recently been recognized that air bags are a highly effective means of deterring or reducing serious injury in the event of an accident. However, air bags are only effectively installed on new vehicles. Moreover, they are quite costly. Thus the need for a simple object which can be attached to a dashboard or other portion of the vehicle still exists.

OBJECTS OF THE INVENTION

It is, therefore, a primary object of the present invention to totally encircle a seat belt or at least a portion of a seat belt with plush padding to thereby provide a substantial degree of protection regardless of the direction of a force vector imposed upon a body during an impact.

It is also an object of the present invention to provide a protective seat belt cushion of the type stated to provide maximum protection to vital areas of the body even under conditions of maximum impact and particularly provide protection to the female breasts and upper and lower stomach area.

It is a further object of the present invention to provide a seat belt cushion of the type stated and fastening or joining mean which will not restrict accessibility to a seat belt buckle or release button, even though the buckle may be located in the center of and encircled within the protective cushion of the present invention.

It is a further object of the present invention to provide seat belt cushions in a novel form such as in the form of people, places and things and particularly loveable characters, stuffed animals and toys.

It is another object of the present invention to provide a cushion which can be removably attached to a portion of a vehicle, such as a dashboard, in order to absorb some of the force of an impact and thereby protect an occupant of the vehicle.

SUMMARY OF THE INVENTION

The foregoing objects, together with other objects and advantages which will become apparent from the following detailed description of preferred embodiments of the invention are achieved in a protective seat belt cushion formed of a plurality of sections, limbs, cushion sections as well as objects and electronic devices. These various objects and sections, limbs and electronic devices, may be adapted for cooperative assembly in order to form seat belt cushions in the form of people, places, things animals, birds and insects. These objects and particularly, electronic devices may provide means to communicate messages such as messages in the form of safety tips. Thus, in one embodiment, a miniature tape or electronic circuit which provides messages may be employed.

The sections and objects are secured to the cushion by joining means such as fiber fastener strips which may be on the sections and objects and on the cushion. Preferably, fiber fastener strips of the type offered under the mark "Velcro" and snap fasteners and coil housings which wrap around the seat belt may also be employed. It is preferable to provide a joining means which secures the cushion to the seat belt without covering the belt buckle and the release button.

In another embodiment of the invention, there is provided a protective cushion which may be removably attached to portions of a vehicle, such as a dashboard. This latter embodiment of the cushion may contain a fluid interior such as an air interior core or otherwise it may contain soft padding. In this way, if an occupant of the vehicle is thrown forward upon an impact, the cushion can absorb some of the force of the impact.

This invention possesses many other advantages and has other purposes which may be made more clearly apparent from a consideration of the forms in which it may be embodied. These forms are shown in the drawings forming a part of and accompanying the present specification. They will now be described in detail for the purpose of illustrating the general principles of the invention, but it is to be understood that such detailed description is not to be taken in a limiting sense.

BRIEF DESCRIPTION OF THE DRAWINGS

Having thus described the invention in general terms, reference will now be made to the accompanying drawings in which:

FIG. 8 is a perspective view of a modified form of a cushion in the form of a bunny rabbit and which has a pocket for receiving devices such as radios or the like;

DETAILED DESCRIPTION OF PREFERRED EMBODIMENTS

Figure 1:
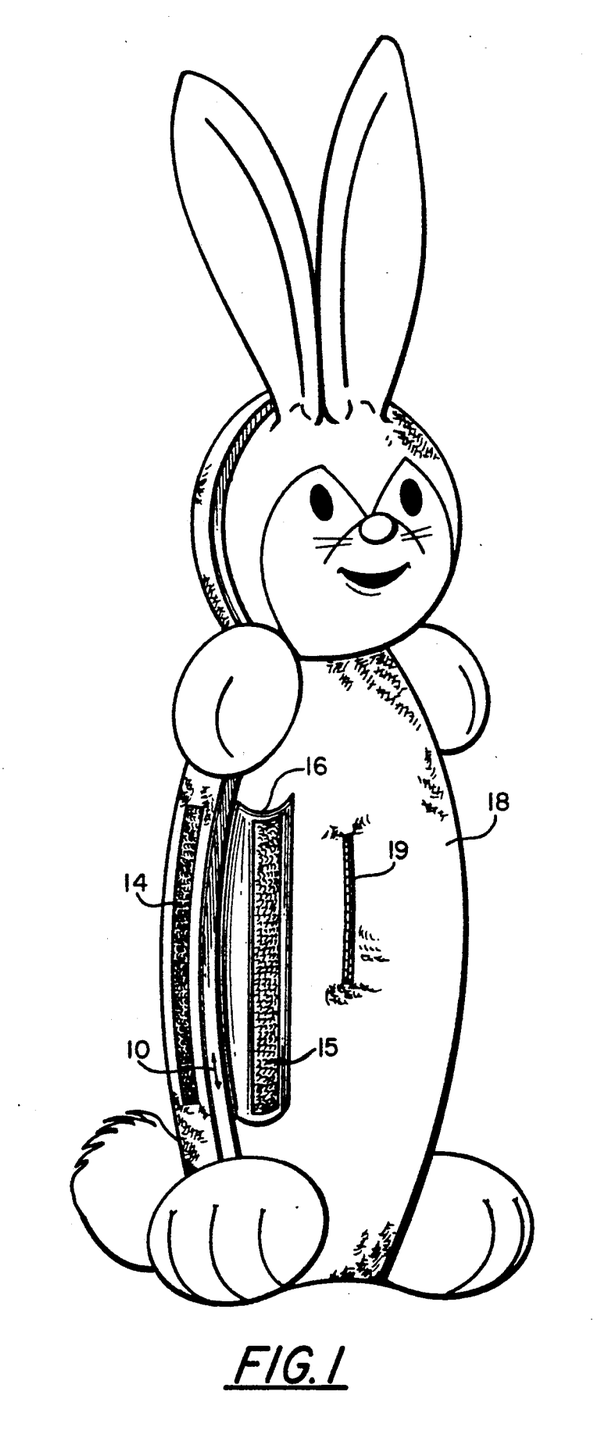
FIG. 1 is a perspective view of a novel seat belt cushion in a form of a bunny rabbit and which opens in the manner of a book to be secured about a seat belt within the center portion thereof.

A perspective view of FIG. 1 illustrates a novel seat belt cushion in the form of a bunny rabbit 18 in accordance with the present invention. The seat belt is capable of extending into and through the opening 10 which extends through the cushion 18 from one transverse side to the other transverse side. The cushion may be secured about the seat belt in the closed position by means of a fastener strip 14 which coacts with another fastener strip 15.

By further reference to FIG. 1, it can be observed that the fastener 15 is located on a flap 16 and this flap 16 may have another fastener on its opposite side. In this way when the cushion 18 is fully opened, there may be another character or depiction of a character located at the central opening 10. The fiber fastener strips 14 and 15 are preferably those fiber fasteners strips marketed under the trademark "Velcro", that is where strips containing hooks and strips containing loops are employed. However, other fiber fastener strips could be employed in accordance with the present invention.

The cushion 18 is also provided with a zippered access opening 19 in order to obtain access to the padding material. Thus, when it is desired to change or remove any of the padding material or add additional padding material, it is only necessary to open the zipper 19 for access thereto.

Figure 2A:
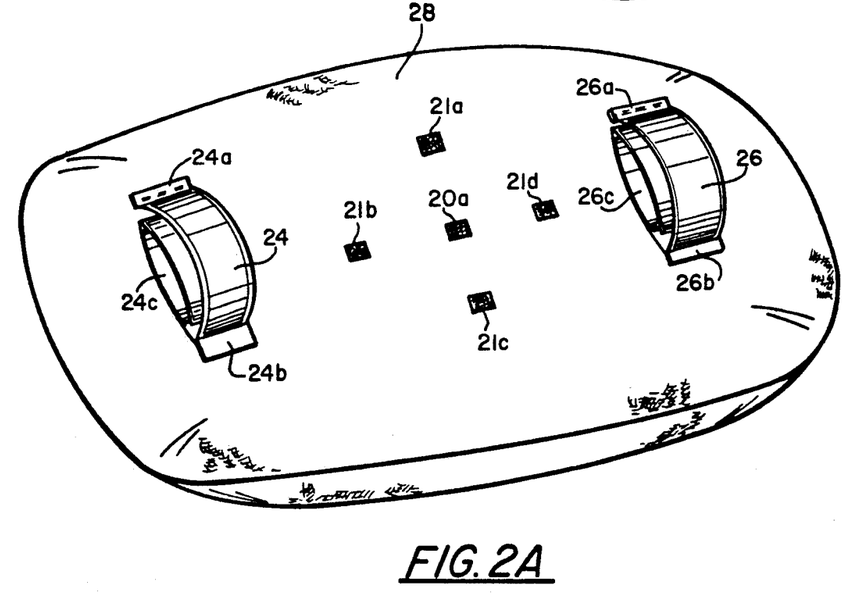
FIG. 2 is a perspective view of a novel seat belt cushion in a form which has representation of places and which is secured to a seat belt by means of a coil housing.
Figure 2B:
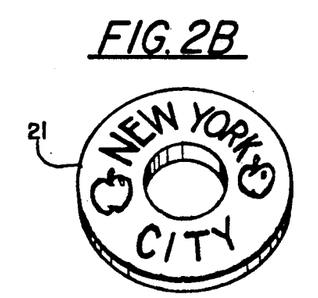
Figure 2C:
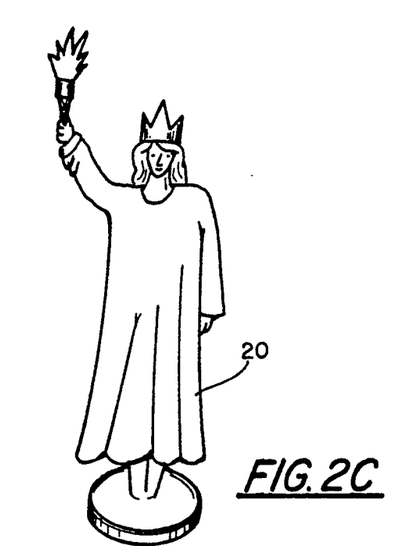

FIG. 2 is a perspective view of a seat belt cushion 28 in the form of a place, that is, a geographical location. A name tag 21 provided for use with this seat belt cushion and reveals the name of that particular place and in this embodiment is New York City. A monument 20 may be located on the tag 21 and the name tag 21 may be secured to the cushion 28 by means of fasteners 21a, 21b, 21c and 21d. The monument or other object 20 may be secured to the cushion 28 by means of the fastener 20a. The cushion 28 may be secured to the seat belt through the use of coil fasteners 24 and 26 which in effect form a coil to loop above the seat belt. One end 24a of the coil fastener and one end 26a of the fastener is stitched to the cushion 28. The other ends of the coil fasteners, that is the fasteners 24b and 26b are fastened to the cushion 28 and the tongues 24c and 26c of the coil fasteners wrap about the seat belt.

Figure 3:
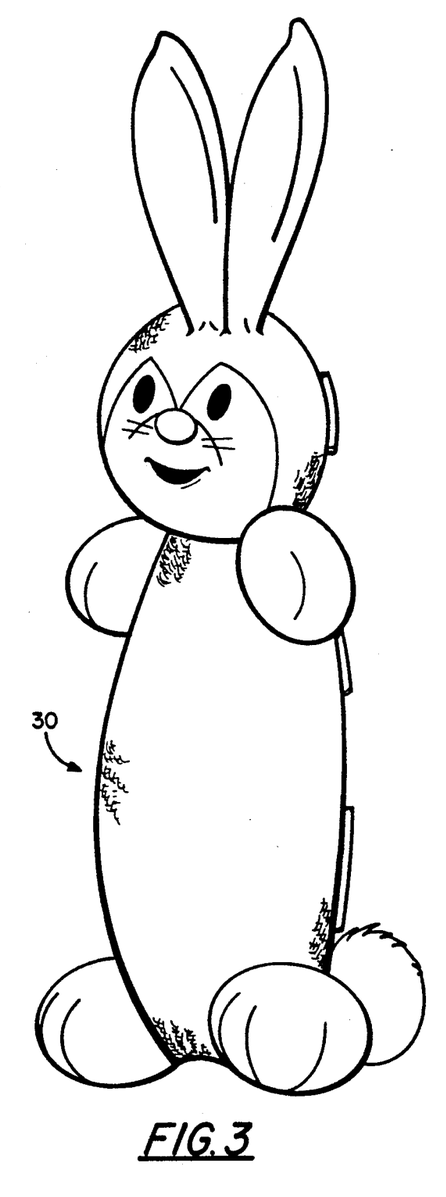
FIG. 3 is a perspective view of a novel seat belt cushion in the nature of a toy bunny rabbit, somewhat similar to FIG. 1.

FIG. 3 is a perspective view of a novel seat belt cushion 30 where it appears as a normal toy. However, this is a unique toy in that it reduces injuries and may save lives, particularly lives of unborn children.

Figure 4:
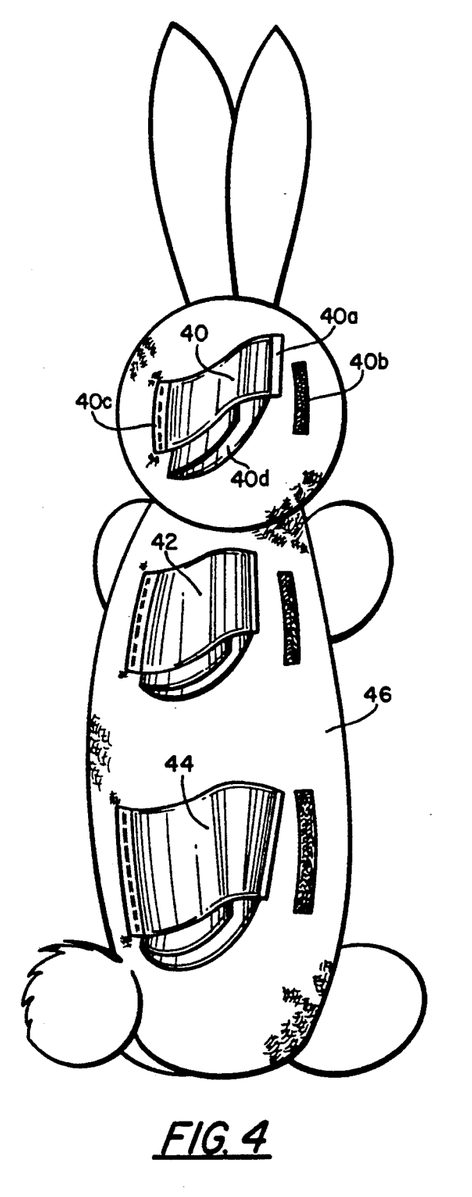
FIG. 4 is a perspective rear view of the seat belt cushion of FIG. 3 and which employs three coil fasteners on the rear portion thereof.

FIG. 4 is a perspective view of a novel seat belt cushion 46 and which may actually be the rear construction of the seat belt cushion 30 shown in FIG. 3. This novel seat belt cushion 46 is provided with three coil fasteners 40, 42 and 44 which are secured to the rear surface. One end 40c of the coil fastener 40 is stitched to the cushion 46. The other end 40a has a fastener secured thereto and interacts with a fastener 40b on the cushion itself. A tongue 40d wraps about the seat belt and in this way it is possible to secure the cushion to the seat belt. Each of the other coil fasteners 42 and 44 operate in essentially the same way.

Figure 5:
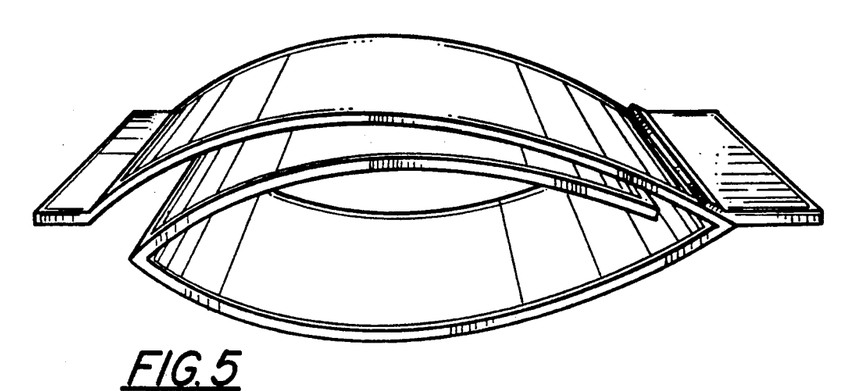
FIG. 5 is a perspective view of coil fasteners which may be used with the seat belt cushions.

FIG. 5 is an enlarged perspective view of a coil fastener of the type which may be employed in the novel seat belt cushion of the present invention.

Figure 6:
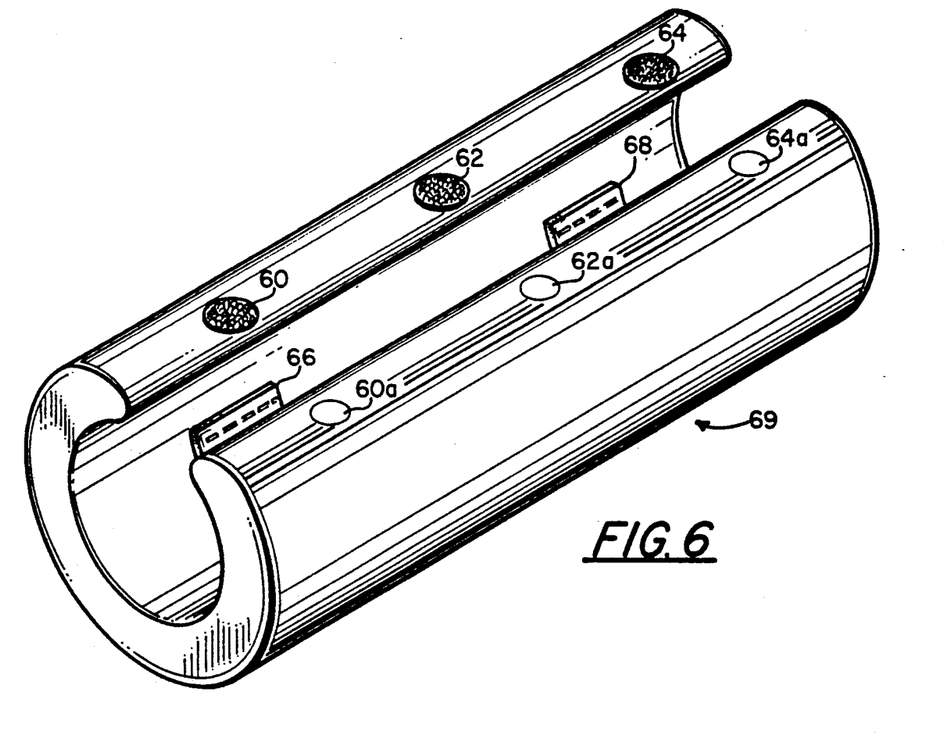
FIG. 6 is a perspective view of a novel seat belt cushion which encircles the seat belt with plush padding.

FIG. 6 is a perspective view of a further version of a novel seat belt cushion 69 which is constructed in accordance with the present invention. A fastener 60 interacts with a fastener 60a. In like manner, a fastener 62 interacts with a fastener 62a and another fastener 64 interacts with a cooperating fastener 64a. A coil fastener 66 and a coil fastener 68 are provided for securing the protective cushion 69 about the center of a seat belt and to thereby encircle the seat belt with a form of plush padding. Fasteners may also be added to this cushion in order to secure heads, limbs, objects or other devices to the cushion in order to provide a character or representation to the cushion.

In the embodiment of FIG. 6, it can be observed that the seat belt cushion effectively envelopes and wraps about the seat belt and is openable and closable from opposite ends, much in the nature of a book. The same construction essentially holds true in the seat belt cushion of FIG. 1. While the opening 10 in the seat belt cushion of FIG. 1 could be an elongate slot, it could also be in the form of an elongate opening where the seat belt cushion could be hinged at its lower end or its upper end for opening in a type of clamshell construction to thereby receive a portion of a seat belt, encircle that seat belt and enclosed around the seat belt.

Figure 7:
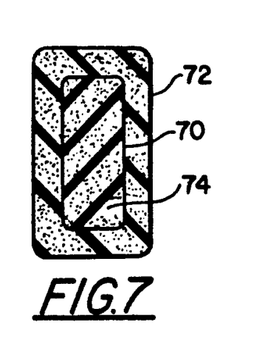
FIG. 7 is a sectional view showing a padded foam block which may be used as part of the padding material in the seat belt cushion of the present invention.

FIG. 7 illustrate a foam block of padding material such as conventional plastic foam material which may be used as the padding in the seat belt cushions of the invention. This foam padding block 70 is initially provided with a hollowed-out area 72. This hollowed-out area could be sealed and filled with a gaseous material such as air or the like. In the embodiment of the invention as illustrated in FIG. 7, an additional fiber or foam material 74 is inserted in the hollowed-out area. In accordance with this construction, there is a two stage impact absorption. In other words, a first stage of impact absorption results from the foam block 70 and a second stage results from the interior foam material 74.

Figure 8:
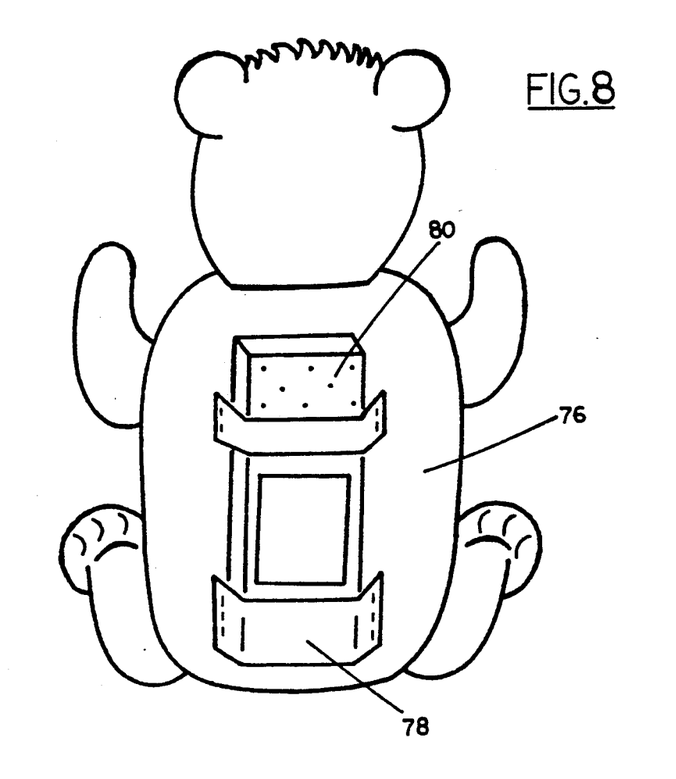

FIG. 8 discloses an embodiment of a seat belt cushion, also in the nature of a bunny rabbit as illustrated, and which includes a cushion body 76 similar to that cushion body illustrated in FIGS. 1 and 3 of the drawings. However, this cushion body opens much in the nature of a book to receive a seat belt buckle or a seat belt in an interior pocket. A pocket 78 is formed on the exterior of the cushion 76 and is designed to receive other devices, such as a portable radio or tape player 80.

Figure 9:
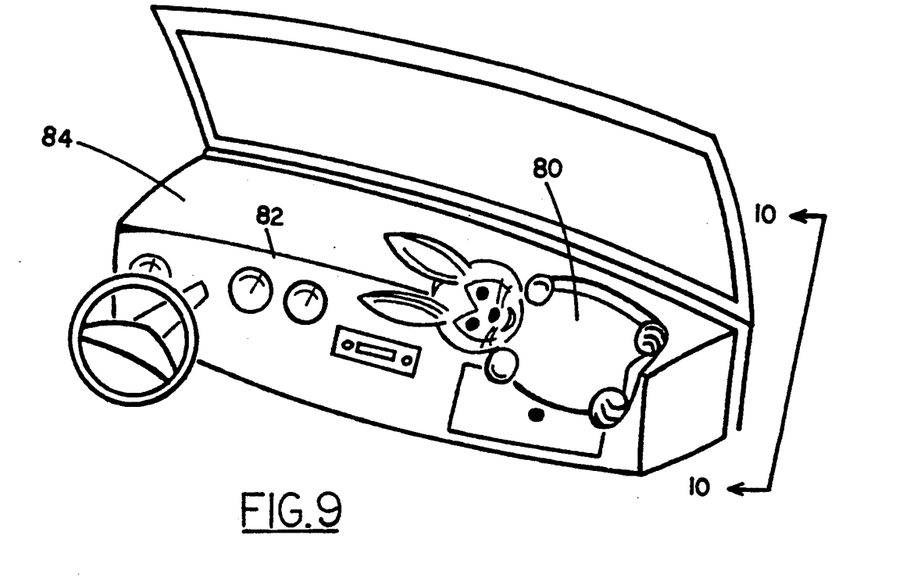
FIG. 9 is a fragmentary perspective view showing a modified form of an animal cushion for removable attachment to a dashboard of a vehicle.

FIGS. 9-12 illustrate an embodiment of a cushion which is provided for releasable attachment to another portion of a vehicle and particularly a dashboard of a vehicle. In FIG. 9, there is illustrated a cushion 80 which is designed for attachment to the upper corner portion 82 of an automobile dashboard 84. In this case, if there is no air bag in the vehicle and occupant of the front seat is propelled forward upon an impact, the force of that impact will be absorbed to a substantial extent by the cushion 80 on the dashboard, thereby reducing the incidence of injury to that occupant.

Figures 10, 11:
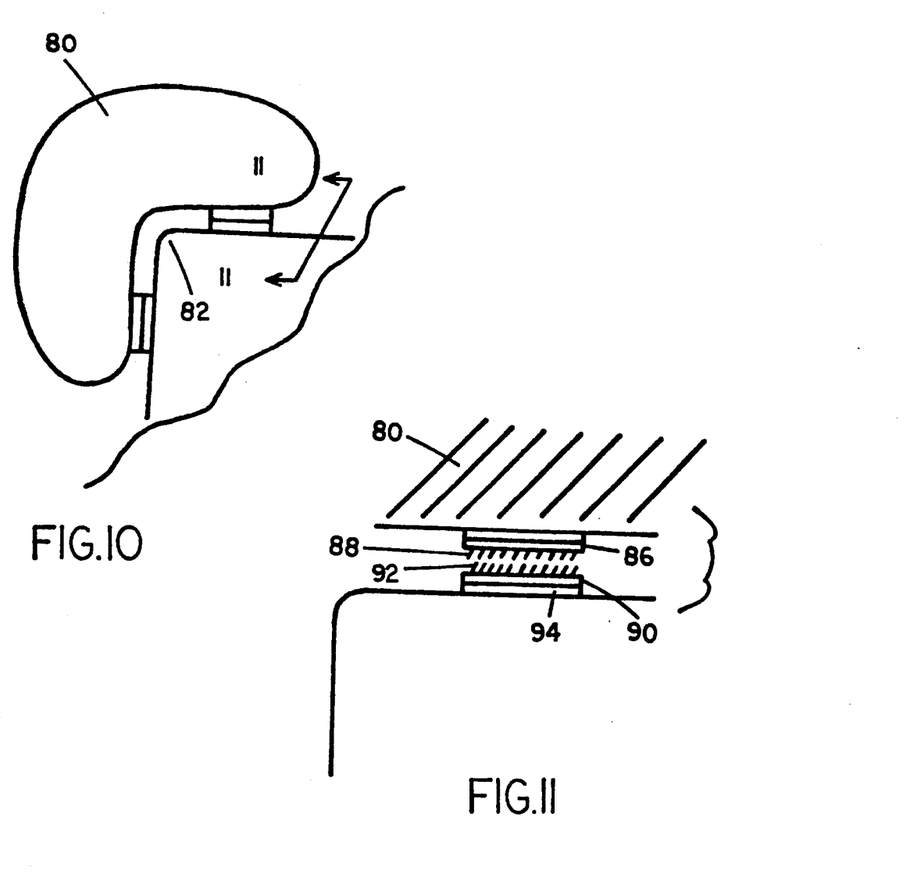
FIG. 10 is an end elevational view taken along the plane of line 10—10 and showing the attachment of the seat belt cushion of FIG. 9 to a dashboard.
FIG. 11 is an enlarged sectional view taken substantially along the plane of line 11—11 of FIG. 10 and showing the means for attachment of the cushion to the dashboard.

The protective cushion 80 is somewhat bendable so as to be foldable over the corner portion of the dashboard as illustrated in FIG. 10. In this case, the occupant is protected against a somewhat sharp edge on the dashboard which could cause substantial injury, particular to the sternum region of an occupant or the head of a child occupant if that occupant were propelled forwardly.

The cushion 80 is provided on its surface with a Velcro strip 86 having a plurality of fiber hooks 88. The dashboard itself may also be provided with a Velcro layer 90 having a plurality of fiber loops 92. In order to provide for attachment of the Velcro strip 90 to the dashboard, this strip 90 could be provided with an adhesive backing 94. It should also be understood that the cushion could be attached to the dashboard by other means, such as an adhesive strip on the cushion itself.

Figures 12, 13, 14:
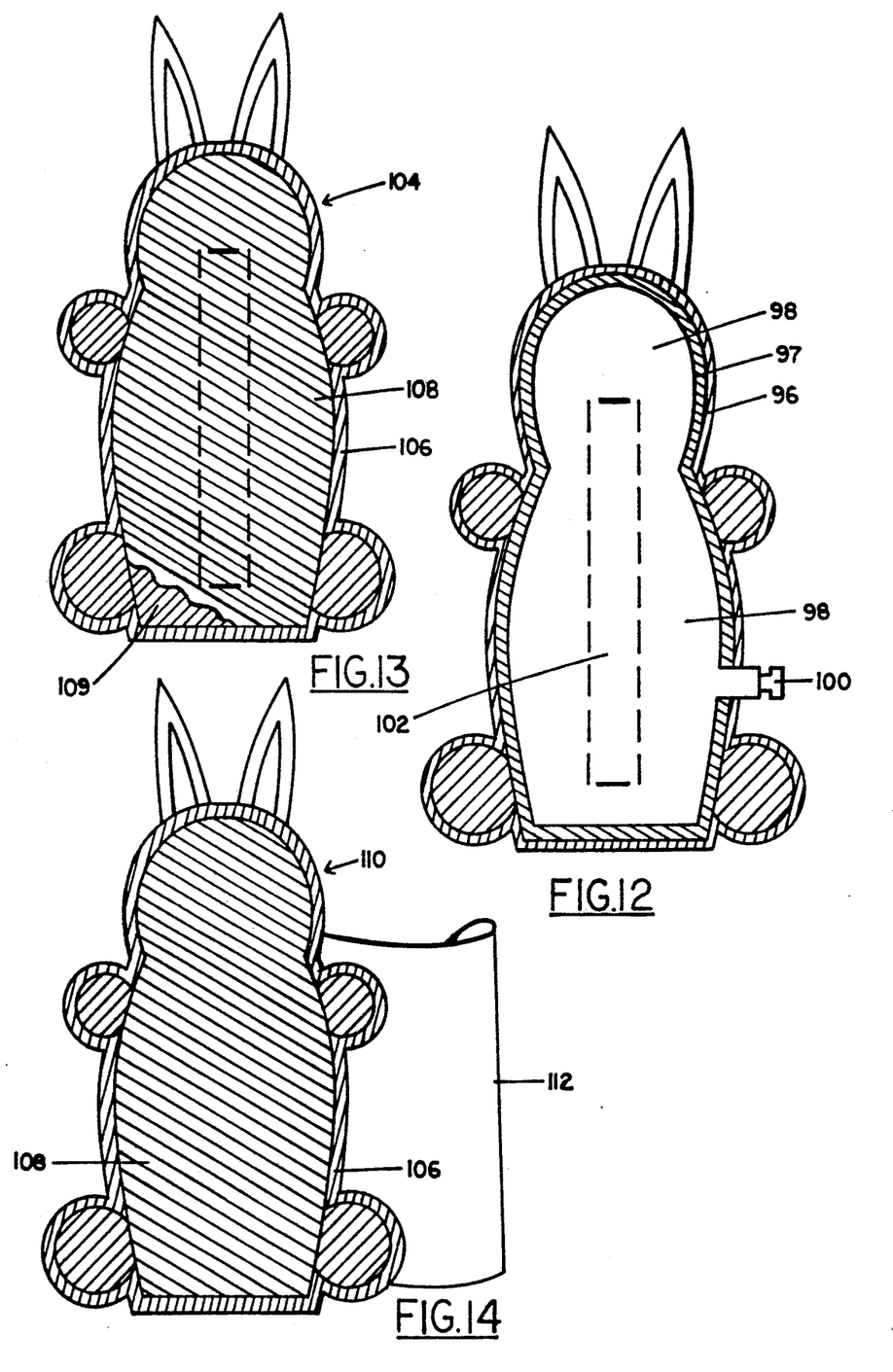
FIG. 12 is a vertical sectional view of a cushion in the form of a bunny rabbit which can be removably attached to a portion of an automotive vehicle.
FIG. 13 is a vertical sectional view, similar to FIG. 12, and showing an alternate form of a cushion in the form of a bunny rabbit which can be secured to a portion of an automotive vehicle.
FIG. 14 is a vertical sectional view of still another embodiment of a cushion in the nature of a bunny rabbit which can be attached to a portion of an automotive vehicle with an extended flap.

The cushion may be made with an outer liner 96 having a hollow interior chamber 98. An inner protective layer 97 may be provided for providing some resistance against puncture or other rough handling. This layer 97 may be formed of a fiber material or a thin metal or metalized plastic material. This interior chamber is preferably filled with air or another gas. However, it could also be filled with a liquid such as water and which cushion is rupturable upon a strong impact to thereby absorb some of the force of an impact. However, the air cushion is believed to be highly effective. A filler valve 100 is also formed in the outer body 96 in order to introduce a fluid such as air into the chamber 98.

The outer surface of the body 96 is provided with a Velcro strip or an adhesive strip 102 or the like for attachment to the vehicle. Here again, other means of attachment may be employed. Furthermore, a plurality of these strips properly arranged could also be used.

FIG. 13 illustrates an embodiment of a protective cushion for attachment to a dashboard of a vehicle or other portion of the vehicle and which is similar to the cushion of FIG. 12. This embodiment of a cushion 104 also contains an outer skin such as fabric skin 106 and which is filled with a foam core 108 in the interior portion thereof. A fiber layer 109 may also be included for some rigidity although while still providing softness and flexibility. In this case, the foam core and the filler layer will absorb some of the force of an impact.

FIG. 14 illustrates an embodiment of a protective cushion 110 and which is similar to the cushion 104 of FIG. 13. In this case, the cushion 110 is also filled with an interior foam core 108 but is provided on the body 106 with an outwardly extending fabric flap 112. This fabric flap may be provided for attachment to a portion of the dashboard or other portion of the vehicle. Thus, for example, this fabric flap may be tucked under a radio speaker grill or the like in order to releasably hold the cushion to the dashboard.

Figure 15:
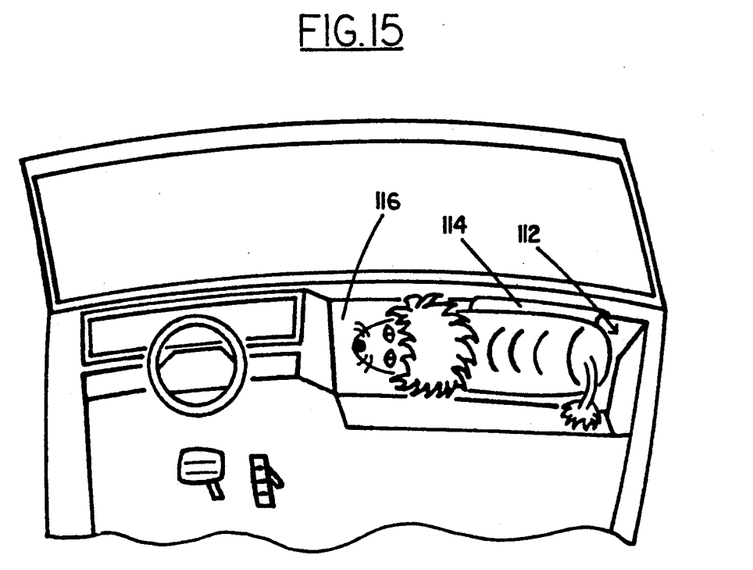
FIG. 15 is a fragmentary perspective view showing an embodiment of a cushion, similar to that of FIG. 14, having an extended flap and attached to a dashboard of a vehicle.

FIG. 15 illustrates a protective cushion which may be provided for attachment to a dashboard of the vehicle and which has an extended flap 112 for attachment. In this case, the extended flap 112 which is formed of a flexible material is inserted between the door and the frame of the glove compartment of the vehicle. Thus, the protective cushion 110 in FIG. 15 has an extended flap 112 disposed between the door 114 of the glove compartment 116 and the frame thereof.

Figure 16:
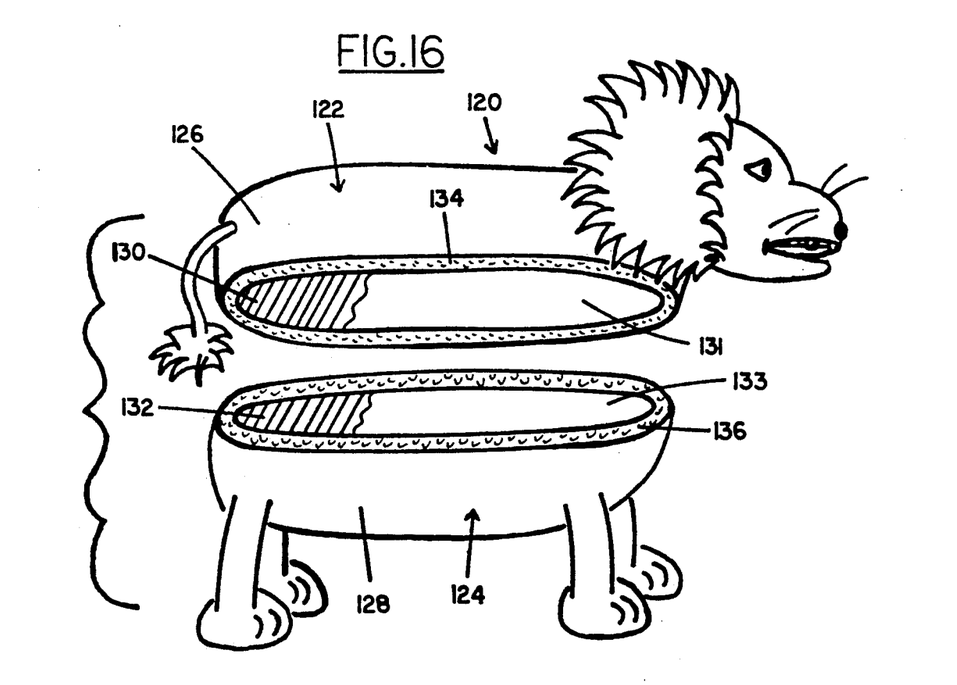
FIG. 16 is an exploded perspective view showing another modified form of cushion constructed in accordance with and embodying the present invention.

FIG. 16 illustrates another embodiment of a protective seat belt cushion which is constructed in accordance with and embodying the present invention. This seat belt cushion 120 is in the nature of an animal and which is split longitudinally to provide an upper animal section 122 and a lower animal section 124. The upper animal section 122 is entirely split from the lower animal section 124. Moreover, each of the animal sections are provided with outer skins 126 and 128, respectively and filled with foam cores 130 and 132, respectively and covered by sheets 131 and 133, respectively. The upper animal section has a Velcro strip 134 on its lower surface and which mates with a similar Velcro strip 136 on the upper surface of the lower animal section 124. In this way, the two animal sections can be split apart so that a seat belt and the buckle thereof can be located between the two animal sections. The two sections are then facewise disposed upon each other and releasably locked to one another with a seat belt buckle therebetween.

This latter described embodiment of the seat belt cushion is very similar to that embodiment which opens and closes in the nature of a book as shown in FIG. 1. However, in this case, the two sections are not hinged, but rather are separable from one another.

Figure 17:
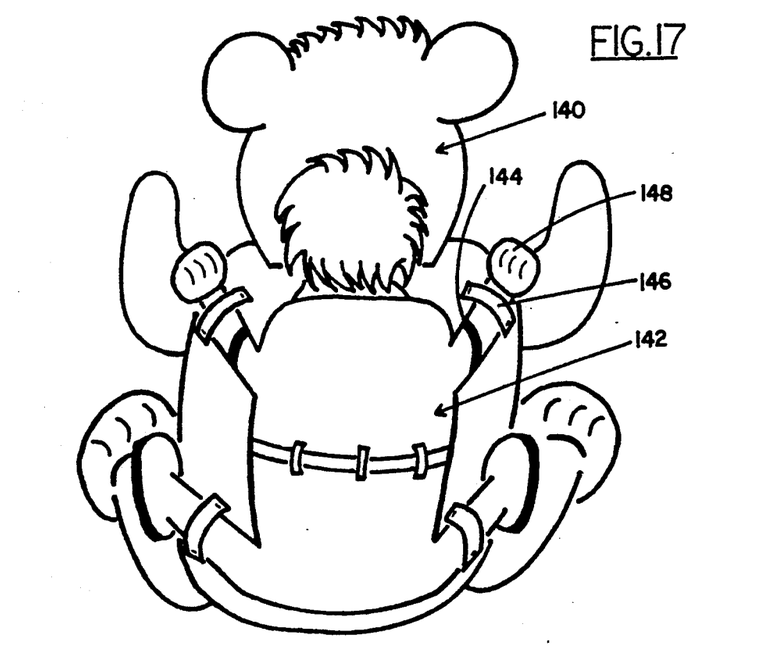
FIG. 17 is a rear elevational view of still a further modified form of cushion constructed in accordance with and embodying the present invention.

FIG. 17 illustrates still a further embodiment of the invention which includes a first animal body 140 and a second animal body 142. The first animal body 140 is constructed in the shape of a bear and the second animal body 142 is also constructed in the shape of a bear in the embodiment as illustrated, with the second of the bears being somewhat smaller than the first. In this case, the smaller bear 142 is provided with arms 144 which are capable of being removably inserted into loops 146. In this case, the arms 146 are retained by enlarged hands 148. Thus, when it is desired to separate the two animal body FIGS. 140 and 142, the hands 148 can be squeezed through the loops 146 and removed therefrom.

In use, the seat belt and particularly, the buckle portion thereof is inserted in the space between the two animal bodies 140 and 142. When it is desired to remove the seat belt buckle and the seat belt, it is only necessary to remove two of the arms and the associated hands from the loops, or otherwise, two of the legs and the associated feet from the loops.

The embodiments of the cushions illustrated in FIG. 16 and 17 can also be used for attachment to a portion of the dashboard or the like. Thus, and in this case, either of the animal body figures in FIG. 17 could be provided with Velcro layers for attachment to a dashboard or otherwise an extended flap for attachment to a dashboard. The same holds true with the animal body FIG. 16.

The novel seat belt cushions and coil fasteners as heretofore described are distinguished by a plurality of sections, objects, devices and means for joining these sections. In this way, it is possible to form a seat belt cushion which can adopt the form of and resemble people, places, things and animals. The ability of the seat belt cushion to completely encircle the seat belt with plush padding provides a substantial degree of protection. As indicated, the seat belt cushion can open like a book and also can be in a reversible form and provide access to a belt buckle and a release button. In the embodiments which employ a coil fastener, that fastener is capable of securing the cushion to a seat belt and this will also allow access to the belt buckle and the release button. The tongue of the coil fastener may provide an added degree of security.

It should be understood that while the various limbs, objects and things may be secured to the cushions by fasteners, such as fiber fastener strips, they also may be permanently secured to the cushions. The coil fasteners may also be used to secure pre-existing stuffed animals, toys and pillows if they are sufficiently padded or modified.

Although the drawings and specification disclose the best mode of the invention which I have contemplated to embody my invention, it should be understood that the invention is in no way limited to the details of this disclosure. In further practical applications of my invention, some changes in form and construction may be made in order to conform to certain circumstances without departing from the spirit and scope of the invention and would be encompassed by and within the scope of the appended claims.

Having thus described m invention what I desire to claim and secure by Letters Patent is:

1. A novel seat belt cushion adapted for removable disposition about a seat belt buckle or a portion of a seat belt or both, said seat belt cushion comprising:
 a) a main cushion in the shape of a body of a living or fictional creature or an object, said main cushion being comprised of a first body section and a second body section,
 b) hinge means connecting said first body section to said second body section,
 c) an interior pocket formed between said first and second sections and which interior pocket extends from one peripheral portion of said main cushion to another peripheral portion thereof so that said two sections are openable along said hinge means to expose said pocket and receive said buckle or seat belt or both and where said sections are closable to enclose said buckle or a portion of the seat belt or both,
 d) means to hold said two sections together along edges of said peripheral portions so that said seat belt cushion can be held in place on said seat belt and so that it can be removed therefrom, and
 e) padding means in the main cushion and adopted to absorb some of the force of an impact.

2. The novel seat belt cushion according to claim 1 wherein a plurality of additional cushioned sections are provided for attachment to said main body cushion to form a representation of living or fictional creatures.

3. The novel seat belt cushion according to claim 1 wherein said seat belt cushion is reversible.

4. The novel seat belt cushion according to claim 1 wherein said novel seat belt cushion has at least one opening for removal of contents.

5. The novel seat belt cushion according to claim, 1 wherein the means to releasably lock said two sections are Velcro fastener strips.

6. The novel seat belt cushion according to claim 1 wherein said cushion comprises at least one sheet of foam padding material of natural fiber or synthetic fiber and an outer sheet layer which encloses said padding.

7. The novel seat belt cushion according to claim 1 wherein an outer pocket is formed on the main cushion in order to removably receive small hand holdable devices.

8. The novel seat belt cushion according to claim 1 wherein the cushion is provided with an externally located attachment means for removable attachment to another portion of an automotive vehicle to reduce the force of an impact by an occupant in the event of a collision.

9. A novel protective cushion for removable attachment to a portion of an automotive vehicle to absorb the impact of an occupant of the vehicle against that portion of the vehicle, said protective cushion comprising:
 a) an outer sheet in the shape of a body of a living or fictional creature or an object,
 b) means forming an interior chamber in said body and which interior chamber includes a material capable of absorbing some of the force of an impact by an occupant of the vehicle against that portion of the vehicle covered by the protective cushion,
 c) means on said outer sheet to enable the introduction or removal of the material from the interior chamber, and
 d) means for removably attaching to cushion to a portion of an automotive vehicle in which impact by an occupant is likely in the event of a collision.

10. The novel protective cushion according to claim 9 further characterized in that the means for attaching comprises Velcro strips.

11. The novel protective cushion according to claim 9 further characterized in that the portion of the vehicle to which the cushion is attached is the vehicle dashboard.

12. The novel protective cushion according to claim 9 further characterized in that the material is air.

13. The novel protective cushion according to claim 12 further characterized in that the means to enable introduction or removal is a valve.

14. The novel protective cushion according to claim 9 further characterized in that the material is a foam padding material.

15. The novel protective cushion according to claim 9 further characterized in that the means for attaching comprises an extended flap of sheet material.

16. A novel seat belt cushion adapted for removable disposition about a seat belt buckle or a portion of a seat belt or both, said seat belt cushion comprising:
   a) a main cushion in the shape of a body of a living or fictional creature or an object, said main cushion being comprised of a first body section and a second body section,
   b) a surface of said first body section facing a surface of the second body section,
   c) fastening means on said surfaces for releasably connecting said first body section to said second body section,
   d) said surface of said first body section capable of being spaced from the surface of the second body section to form an interior pocket between said first and second sections and which interior pocket extends from one peripheral portion of said main cushion to another peripheral portion thereof so that said two sections are separable to expose said pocket and receive said buckle or seat belt or both and where said sections are attachable to enclose said buckle or a portion of the seat belt or both, and
   e) padding means in the main cushion and adopted to absorb some of the force of an impact.

17. The novel seat belt cushion according to claim 16 wherein a plurality of additional cushioned elements are provided for attachment to said main body cushion to form a representation of living or fictional creatures.

18. The novel seat belt cushion according to claim 16 wherein the means to releasably connect said two sections are Velcro fastener strips.

19. A novel seat belt cushion adapted for removable disposition about a seat belt buckle or a portion of a seat belt or both, said seat belt cushion comprising:
   a) a first main cushion in the shape of a body of a living or fictional creature or an object,
   b) a second main cushion in the shape of a body of a living or fictional creature or an object,
   c) means for connecting said first main body to said second main body,
   d) an interior pocket formed between said first and second main bodies and which interior pocket extends from one peripheral portion of said first and second bodies to another peripheral portion thereof so that said two bodies are separable to expose said pocket and receive said buckle or seat belt or both and enclose said buckle or a portion of the seat belt or both, and
   e) padding means in each of the main bodies and adapted to absorb some of the force of an impact.

* * * * *